US010793102B2

United States Patent
Jaradi et al.

(10) Patent No.: US 10,793,102 B2
(45) Date of Patent: Oct. 6, 2020

(54) SEAT BELT WEBBING GUIDE

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford global Technologies, LLC, Dearborn, MI (US)

( * ) Notice: Subject to any disclaimer, the term of this patent is extended or adjusted under 35 U.S.C. 154(b) by 97 days.

(21) Appl. No.: 16/158,956

(22) Filed: Oct. 12, 2018

(65) Prior Publication Data
US 2020/0114862 A1    Apr. 16, 2020

(51) Int. Cl.
*B60R 22/24*    (2006.01)
*B60R 22/18*    (2006.01)

(52) U.S. Cl.
CPC ...... *B60R 22/24* (2013.01); *B60R 2022/1825* (2013.01)

(58) Field of Classification Search
CPC .... B60R 2022/1818; B60R 2022/1825; B60R 22/24; B60R 2022/1812; B60R 2022/1831; B60R 22/18
See application file for complete search history.

(56) References Cited

U.S. PATENT DOCUMENTS

| | | | | |
|---|---|---|---|---|
| 2,938,254 A * | 5/1960 | Gaylord | ................. | A44B 11/16 24/171 |
| 4,009,510 A * | 3/1977 | Lindblad | ............. | B60R 22/1855 24/196 |
| 4,208,770 A * | 6/1980 | Takada | ................ | B60R 22/1855 24/136 K |
| 4,444,432 A * | 4/1984 | Kikuchi | .................. | B60R 22/30 24/196 |
| 4,494,774 A * | 1/1985 | Fohl | ....................... | B60R 22/42 242/381.4 |
| 4,993,746 A | 2/1991 | Hagelthorn | | |
| 5,411,292 A | 5/1995 | Collins et al. | | |
| 5,415,432 A | 5/1995 | Thomas | | |
| 6,290,259 B1 | 9/2001 | Drobot et al. | | |
| 6,749,150 B2 | 6/2004 | Kohlndorfer et al. | | |
| 7,325,280 B2 * | 2/2008 | Ichida | ................ | A44B 11/2557 24/170 |
| 7,748,744 B2 * | 7/2010 | Suyama | .............. | B60R 22/1855 280/806 |
| 8,474,106 B2 * | 7/2013 | Richter | .............. | A44B 11/2526 24/170 |

(Continued)

FOREIGN PATENT DOCUMENTS

DE    102008047822 A1 *   3/2010   ............ B60R 22/24
EP      0184172 A2    6/1986

(Continued)

*Primary Examiner* — Laura Freedman
(74) *Attorney, Agent, or Firm* — Frank A. MacKenzie; Bejin Bieneman PLC

(57) ABSTRACT

An assembly includes a seat belt webbing guide including a slot having an upper surface and a lower surface. A rod is supported by the seat belt webbing guide. A roller is supported by the rod. A spring is between the seat belt webbing guide and the rod. The spring the rod toward the lower surface of the slot.

15 Claims, 7 Drawing Sheets

(56) References Cited

U.S. PATENT DOCUMENTS

| | | | | |
|---|---|---|---|---|
| 8,793,844 B2* | 8/2014 | McFalls | ............ | A44B 11/2553 24/170 |
| 9,615,632 B2* | 4/2017 | Okano | ............... | A44B 11/2561 |
| 9,821,757 B2* | 11/2017 | Moeker | ............. | A44B 11/2553 |
| 10,512,309 B2* | 12/2019 | Lee | ....................... | B60R 22/023 |
| 2019/0315310 A1* | 10/2019 | Jaradi | ..................... | B60R 22/24 |

FOREIGN PATENT DOCUMENTS

| | | | | |
|---|---|---|---|---|
| JP | 10181522 A | * | 7/1998 | ............ B60R 22/24 |
| JP | 2016175594 A | * | 10/2016 | |
| JP | 2016210270 A | * | 12/2016 | |

* cited by examiner

SEAT BELT WEBBING GUIDE

BACKGROUND

The seatbelt portion of a vehicle restraint system secures an occupant of a vehicle against harmful movement that may result from a vehicle collision. The seatbelt functions to reduce the likelihood of injury by reducing the force of occupant impacts with vehicle interior structures. In this role, the seatbelt applies loads across the chest or lap of the occupant. Controlling or reducing these loads may reduce the risk of occupant injury during a collision.

DETAILED DESCRIPTION

Figure 1:
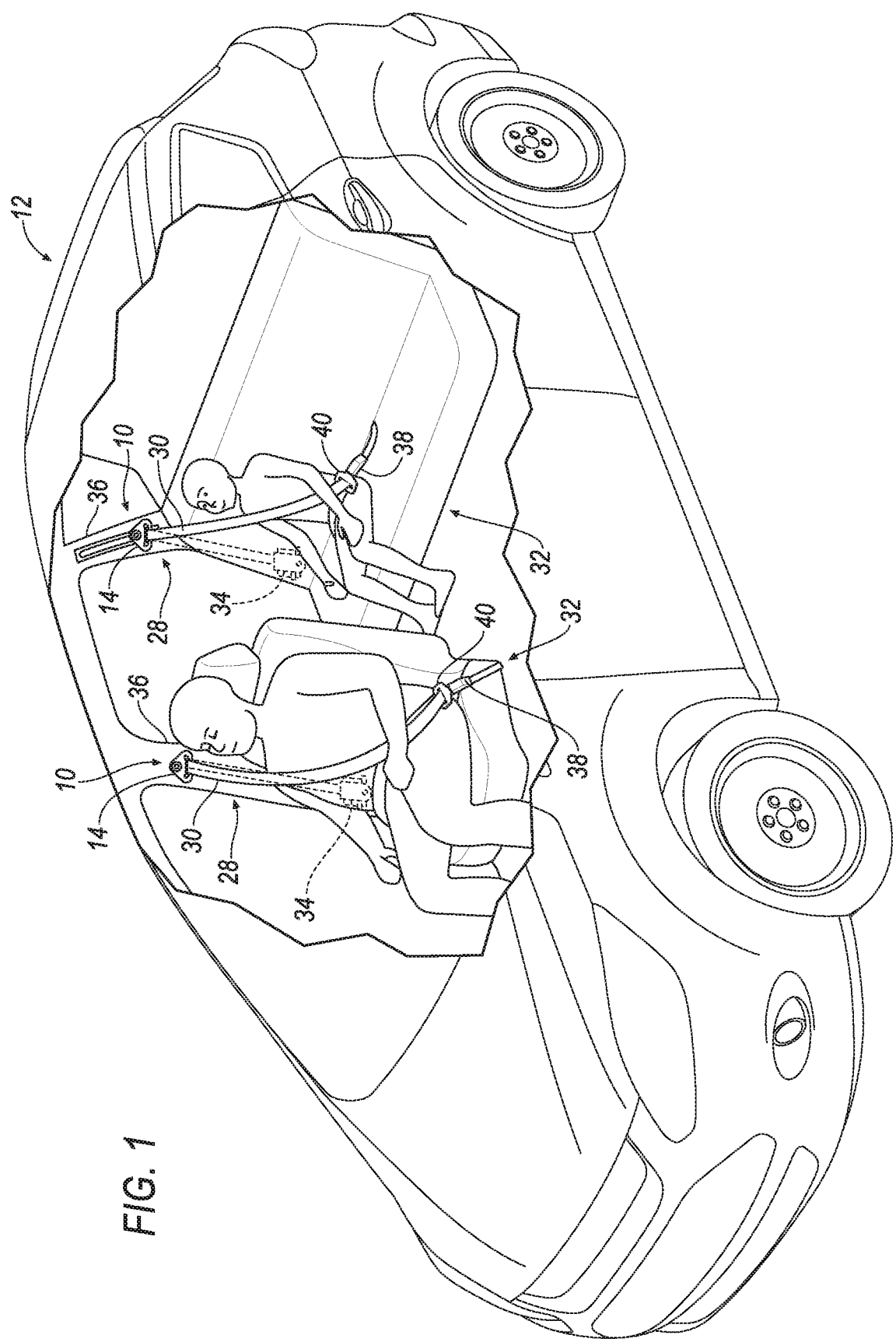
FIG. 1 is a perspective view of a vehicle including a plurality of seat belt assemblies.

With reference to the Figures, wherein like numerals indicate like parts throughout the several views, an assembly 10 of a vehicle 12 includes a webbing guide 14 including a slot 16 having an upper surface 18 and a lower surface 20. A rod 22 is supported by the webbing guide 14. A roller 24 is supported by the rod 22. A spring 26 is between the webbing guide 14 and the rod 22 and biases the rod 22 toward the lower surface 20 of the slot 16.

The assembly 10 is a component of a seat belt assembly 28 including webbing 30 extending through the slot 16. When the webbing 30 and webbing guide 14 are assembled together, the spring 26 biases the rod 22 and the roller 24 toward the webbing 30 to bias the webbing 30 toward the lower surface 20 of the slot 16. The bias of the roller 24 toward the webbing 30 resists roping of the webbing 30, e.g., resulting from an oblique impact of the vehicle 12, at the slot 16 to encourage the webbing 30 to lie flat across a chest of a test dummy and distribute loads across the width of the webbing 30.

With reference to FIG. 1, the vehicle 12 may be any passenger or commercial automobile such as a car, a truck, a sport utility vehicle, a crossover vehicle, a van, a minivan, a taxi, a bus, etc. The vehicle 12 may include one or more seats 32 and may include one or more seat belt assemblies 28, e.g., one seat belt assembly 28 for each seat 32. Said differently, the vehicle 12 may include one or more seat assemblies each including at least one seat 32 and at least one seat belt assembly 28.

Figure 2:
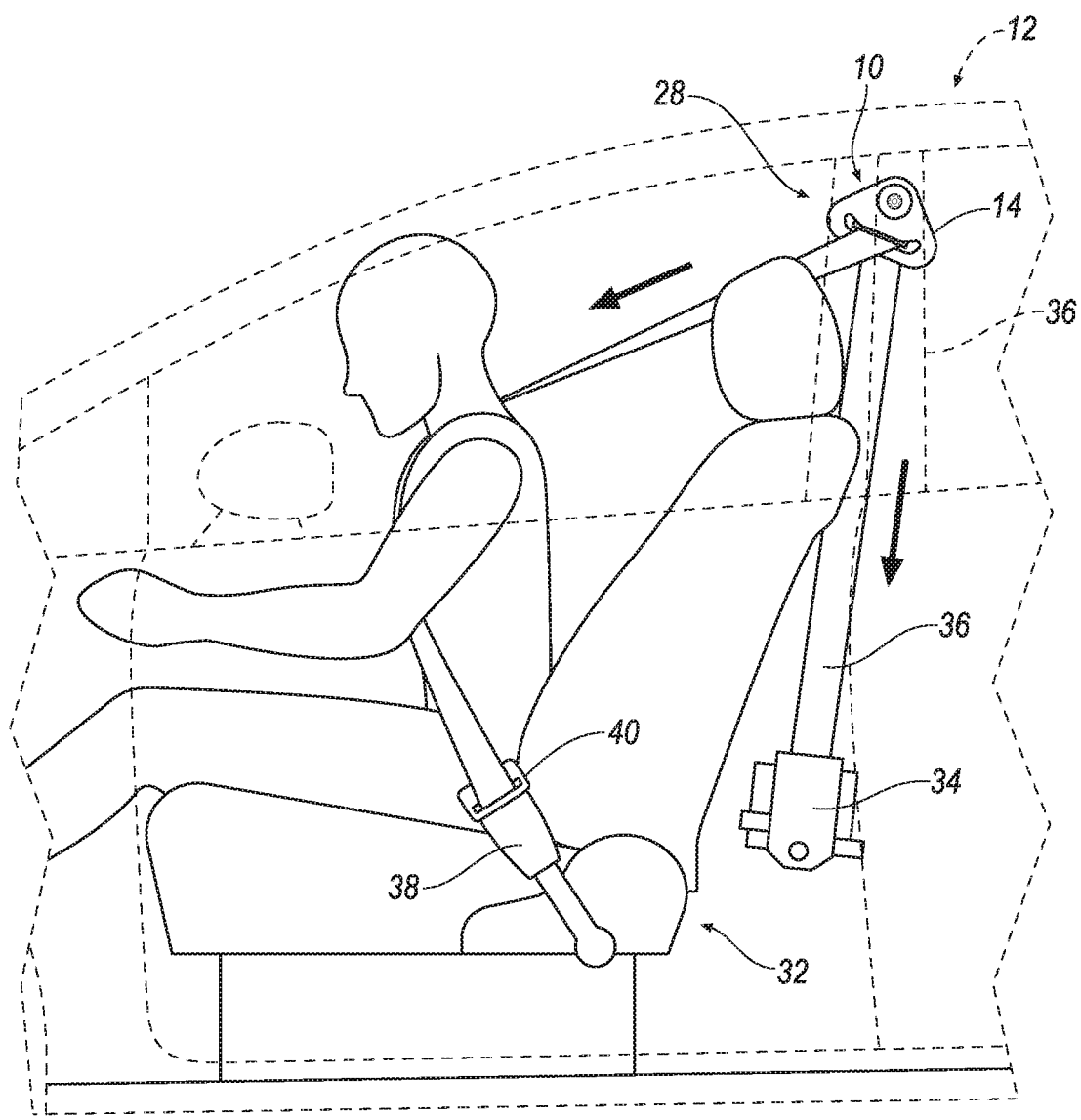
FIG. 2 is a side view of an occupant and a seat belt assembly.

With reference to FIG. 2, the seat belt assembly 28 may include a retractor 34 and the webbing 30. The retractor 34 may be attached to a component of the vehicle 12. For example, a body of the vehicle 12 may include a pillar 36 and the retractor 34 may be attached to the pillar 36. As another example, the retractor 34 may be mounted to the seat 32. The retractor 34 may be attached in any suitable manner, e.g., with one or more fasteners, etc. The webbing 30 may be attached to the seat 32 and/or the body of the vehicle 12. As an example, the seat belt assembly 28 is a three-point harness, meaning that the webbing 30 is attached at three points around the occupant when fastened: a lap-belt mounting, the retractor 34, and the buckle. The restraint system may, alternatively, include another arrangement of attachment points.

The retractor 34 may include a spool and a housing. The spool may freely rotate within the housing. The spool may be configured to receive the webbing 30, for example, by including a webbing 30 attachment slot and permitting the webbing 30 to wind around the spool. The retractor 34 may include a locking mechanism that inhibits rotation of the spool when the vehicle 12 is subject to deceleration above a threshold amount, e.g., during the impact of the vehicle 12.

With continued reference to FIG. 2, the seat belt assembly 28 may include a buckle 38 and a clip 40 releasably engageable with the buckle 38. The clip 40 may be slidably engage with the webbing 30, i.e., retained to the webbing 30 and slidable along the webbing 30. The buckle 38 may be fixed relative to the seat 32. For example, the buckle 38 may have a mounted end that is fixed to the seat 32 or the body of the vehicle 12. The buckle 38 may be spring-loaded to releasably engage a recess on the clip 40.

The webbing 30 may be fabric in the shape of a strap. The webbing 30 is attached to the spool, with the webbing 30 wound around the spool. The webbing 30 may be payable from the retractor 34, e.g., when the spool is not prevented from rotating by the locking mechanism.

Figure 3:
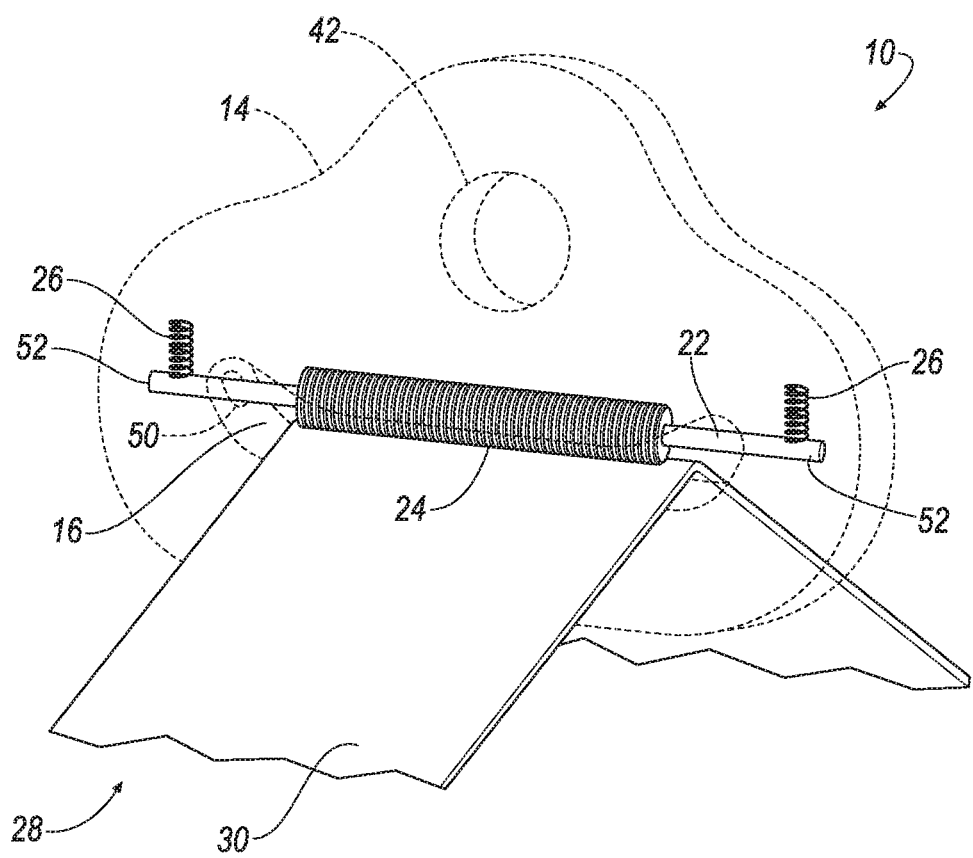
FIG. 3 is a perspective view of a portion of the seat belt assembly including a webbing guide, webbing extending through the webbing guide, and a rod and roller supported by the webbing guide and biased toward the webbing.

With reference to FIGS. 2 and 3, the webbing guide 14, i.e., the seat belt webbing guide, supports the webbing 30 and redirects tension applied thereto. The webbing guide 14 may be fixed to the body of the vehicle 12, as shown in FIGS. 1-2. In such an example, the webbing guide 14 may be vertically adjustable along the body, e.g., the pillar 36. In other words, the webbing guide 14 may be adjusted to a selected vertical position and locked in that selected vertical position. As another example, the webbing guide 14 may be fixed to the seat 32.

Figure 4:
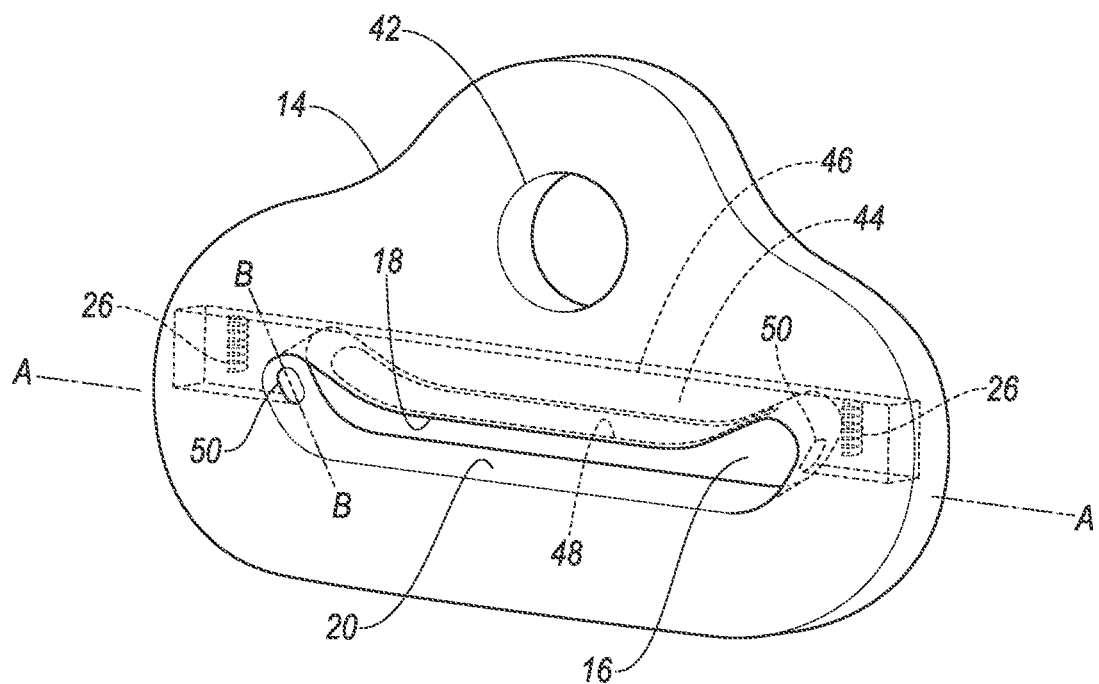
FIG. 4 is a perspective view of the webbing guide.
Figure 5:
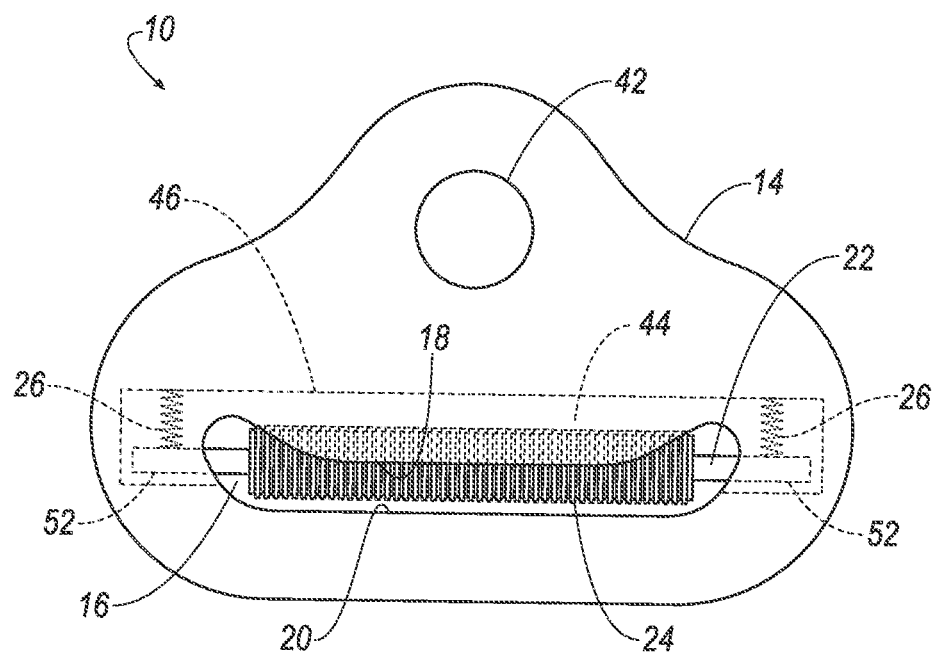
FIG. 5 is a front view of the webbing guide.

With reference to FIGS. 3-5, the webbing guide 14 includes a fastener hole 42. The fastener hole 42 may receive a bolt or other fastener to fix the webbing guide 14 to the body or the seat. For example, in FIGS. 1 and 2, a bolt fixes the webbing guide 14 to the pillar 36.

The webbing guide 14 may be metal, or any other suitable material. The webbing guide 14 may include a shell providing a class-A surface, i.e., a surface specifically manufactured to have a high-quality, finished aesthetic appearance free of blemishes. The shell may be plastic or any other suitable material.

As set forth above, the webbing guide 14 includes the slot 16 having an upper surface 18 and a lower surface 20. The slot 16 is elongated along an axis A. The slot 16 has a length that is greater than a width of the webbing 30.

With reference to FIGS. 4 and 5, the webbing guide 14 may include a cavity 44 that houses at least a portion of the spring 26 (or springs 26, as described below), the rod 22, and/or the roller 24. The webbing guide 14 may include a support wall 46 in the cavity 44 that supports the spring 26. The spring 26 may be fixed to the support wall 46. The spring 26 is disposed between the support wall 46 and the rod 22.

The webbing guide 14 may include a passageway 48 in the upper surface 18. The passageway 48 extends between the cavity 44 and the slot 16. The roller 24 and/or the rod 22 may extend through the passageway 48 from the slot 16 into the cavity 44. The roller 24 and/or rod 22 may extend into and retract from the slot 16 through the passageway 48.

With reference to FIGS. 3 and 4, the webbing guide 14 defines elongated openings 50. The openings may be at ends of the slot 16. Specifically, the elongated openings 50 are elongated along an axis B transverse to the axis A of the slot 16 (as identified in FIG. 4). The elongated openings 50 extend from the slot 16 to the cavity 44. Ends 52 of the rod 22 extend into the cavity 44 through the elongated openings 50. The elongated openings 50 allow the rod 22 to move toward and away from the lower surface 20 of the slot 16 as the spring 26 compresses and releases. As described above, the roller 24 and/or the rod 22 may extend into and retract from the slot 16 through the passageway 48 as the rod 22 moves along the elongated openings 50.

With reference to FIGS. 3-5, as set forth above, the rod 22 is supported by the webbing guide 14. Specifically, ends 52 of the rod 22 extend into the elongated openings 50. The rod 22 may be retained in the elongated openings 50 with other features (not shown) such as retainers (not shown) between the rod 22 and the elongated openings 50 (e.g., on the rod 22 and/or the elongated openings 50) that retain the ends 52 of the rod 22 on the cavity 44. The rod 22 shown in FIG. 6 extends continuously from end 52 to end 52. As another example, the rod 22 could include two separate segments disconnected at the roller 24, i.e., one segment at each end of the roller 24.

As set forth above, the roller 24 is supported by the rod 22. Since the rod 22 is supported by the webbing guide 14, the roller 24 is supported by the webbing guide 14. The roller 24 is rotatable relative to the webbing guide 14. As one example, assembly 10 may include bearings 54 between the roller 24 and the rod 22, as shown win FIG. 6. The bearings 54 may be of any suitable type. In the example shown in FIGS. 3-5, the rod 22 may be rotationally fixed relative to the webbing guide 14, i.e., does not rotate relative to the webbing guide 14. In such an example, the rod 22 does not rotate relative to the spring 26. In the alternative, the rod 22 may be rotatably engaged with the webbing guide 14, e.g., at the elongated openings 50. In the example shown in FIG. 6, the rod 22 is separate from the roller 24. As another example, the rod 22 and the roller 24 may be unitary, i.e., one-piece. In such an example, the roller 24 may be rotatable relative to the webbing guide 14 by rotation of the ends 52 of the rod 22 at the elongated openings 50.

The roller 24 is disposed in the slot 16. Specifically, the roller 24 is between the upper surface 18 and the lower surface 20. As set forth above, the spring 26 is between the webbing guide 14 and the rod 22 and biases the rod 22 toward the lower surface 20 of the slot 16. The assembly 10 may include more than one spring 26, e.g., springs 26 at each end 52 of the rod 22. In such an example, the roller 24 is between the springs 26. As one example, the spring 26 may be a coil spring 26, or may be any other suitable type of spring 26.

The springs 26 bias the roller 24 toward the lower surface 20 of the slot 16. Accordingly, if the webbing 30 is pulled in a way that encourages the webbing 30 to rope, i.e., to bunch, in the slot 16, the bias of the roller 24 toward the lower surface 20 of the slot 16 encourages the webbing 30 to remain flat in the slot 16. As an example, the springs 26 bias the roller 24 into contact with the webbing 30 to encourage the webbing 30 to remain flat in the slot 16. This encourages the webbing 30 to lie flat across a chest of a test dummy and distribute loads across the width of the webbing 30.

Figure 6:
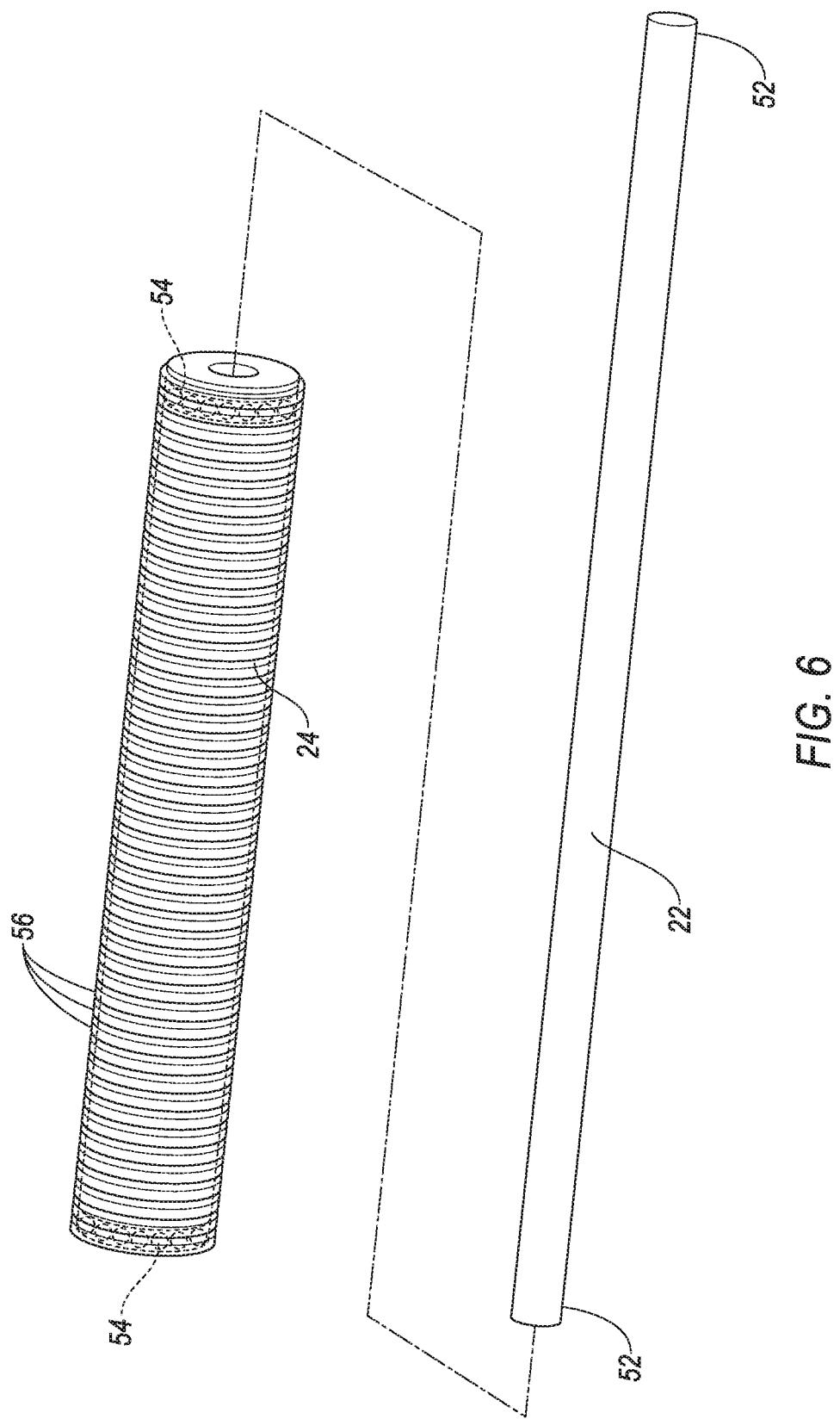
FIG. 6 is an exploded view of the rod and the roller.
Figure 7:
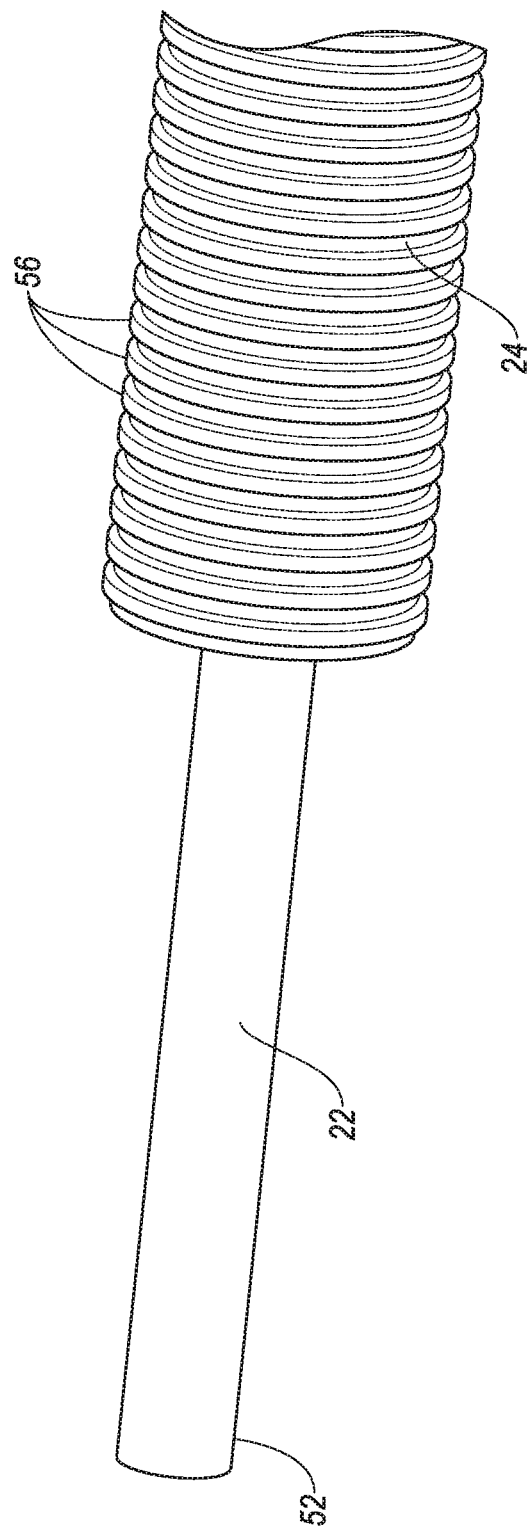
FIG. 7 is a perspective view of a portion of the rod and roller of FIG. 6.
Figure 8:
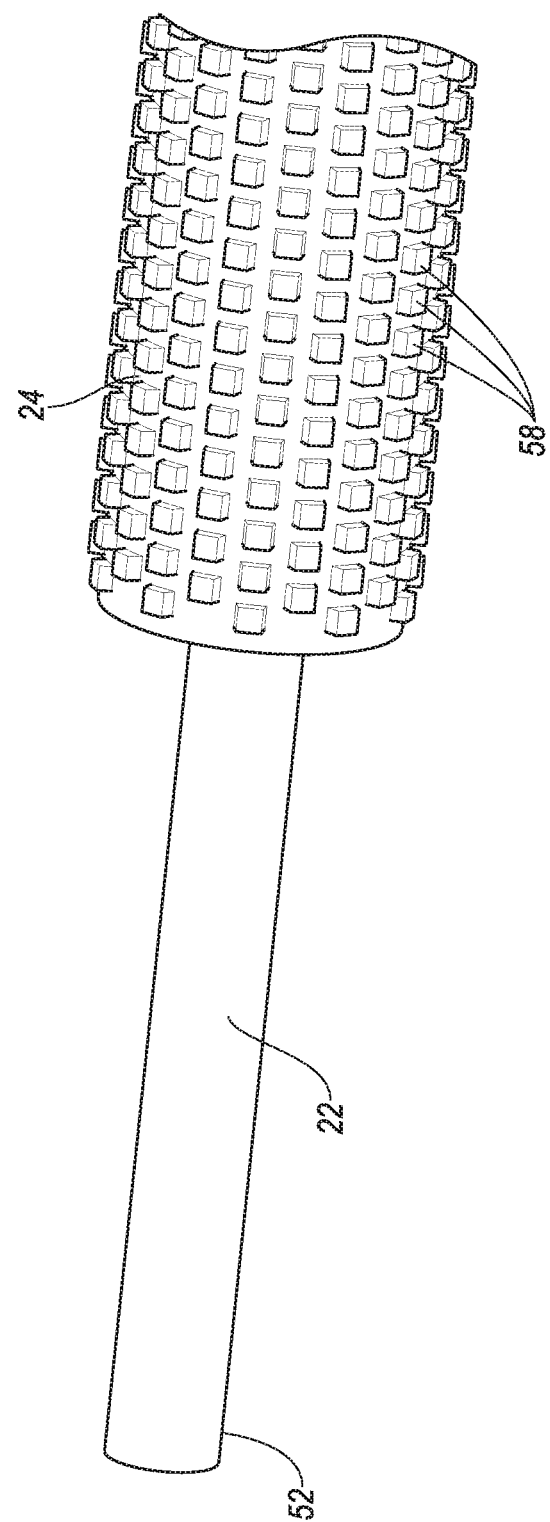
FIG. 8 is a perspective view of a portion of the rod and another example of the roller.

The roller 24 may be shaped to maintain contact with the webbing 30 during movement of the webbing 30 through the slot 16 without adding noticeable resistance to movement of the webbing 30 through the slot 16. As one example, as shown in FIGS. 6 and 7, the roller 24 includes ridges 56. The ridges 56 may be annular about an axis of the roller 24. As another example, as shown in FIG. 8, the roller 24 may be toothed. Teeth 58 on the roller 24 may have curved ends arranged in a cylindrical pattern. The roller 24 may be of any suitable material, such as a polymer, e.g., Teflon®.

The webbing 30 extends through the slot 16 of the webbing guide 14 and is slidably received in the slot 16. The webbing 30 freely slides through the slot 16 during extraction and retraction of the webbing 30 relative to the retractor 34.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat belt assembly comprising:
    a webbing guide including a slot having an upper surface and a lower surface;
    a webbing extending through the slot;
    a rod supported by the webbing guide;
    a roller supported by the rod and rotatable relative to the webbing guide; and
    a spring between the webbing guide and the rod and biasing the rod toward the lower surface of the slot;
    the webbing guide including elongated openings each receiving ends of the rod;
    the slot being elongated along an axis and the elongated openings being elongated along an axis transverse to the axis of the slot;
    the elongated openings having a first end and a second end spaced from the first end along the axis of the elongated openings, the rod being movable along the axis of the elongated openings from the first end to the second end; and
    the roller being rotatable when the rod is at the first end and at the second end of the elongated openings.

2. The seat belt assembly as set forth in claim 1, wherein the roller is between the upper surface and the lower surface.

3. The seat belt assembly as set forth in claim 1, wherein the roller is disposed in the slot.

4. The seat belt assembly as set forth in claim 1, wherein the spring biases the roller into contact with the webbing.

5. The seat belt assembly as set forth in claim 1, wherein the roller includes ridges.

6. The seat belt assembly as set forth in claim 1, further comprising a second spring between the webbing guide and the rod and biasing the rod toward the lower surface of the slot, the roller being between the spring and the second spring.

7. The seat belt assembly as set forth in claim 1, wherein the webbing guide includes a fastener hole.

8. The seat belt assembly as set forth in claim 1, wherein the elongated openings are rounded at the first end and the second end.

9. An assembly comprising:
    a seat belt webbing guide including a slot having an upper surface and a lower surface;
    a rod supported by the seat belt webbing guide;

a roller supported by the rod and rotatable relative to the seat belt webbing guide; and a spring between the seat belt webbing guide and the rod and biasing the rod toward the lower surface of the slot;

the seat belt webbing guide including elongated openings each receiving ends of the rod;

the slot being elongated along an axis and the elongated openings being elongated along an axis transverse to the axis of the slot;

the elongated openings having a first end and a second end spaced from the first end along the axis of the elongated openings, the rod being movable along the axis of the elongated openings from the first end to the second end; and the roller being rotatable when the rod is at the first end and at the second end of the elongated openings.

10. The assembly as set forth in claim 9, wherein the roller is between the upper surface and the lower surface.

11. The assembly as set forth in claim 9, wherein the roller is disposed in the slot.

12. The assembly as set forth in claim 9, wherein the roller includes ridges.

13. The assembly as set forth in claim 9, further comprising a second spring between the seat belt webbing guide and the rod and biasing the rod toward the lower surface of the slot, the roller being between the spring and the second spring.

14. The assembly as set forth in claim 9, wherein the seat belt webbing guide includes a fastener hole.

15. The assembly as set forth in claim 9, wherein the elongated openings are rounded at the first end and the second end.

* * * * *